J. E. BROWN.
COVERED MILK PAIL.
APPLICATION FILED JAN. 19, 1911.
1,005,687.
Patented Oct. 10, 1911.
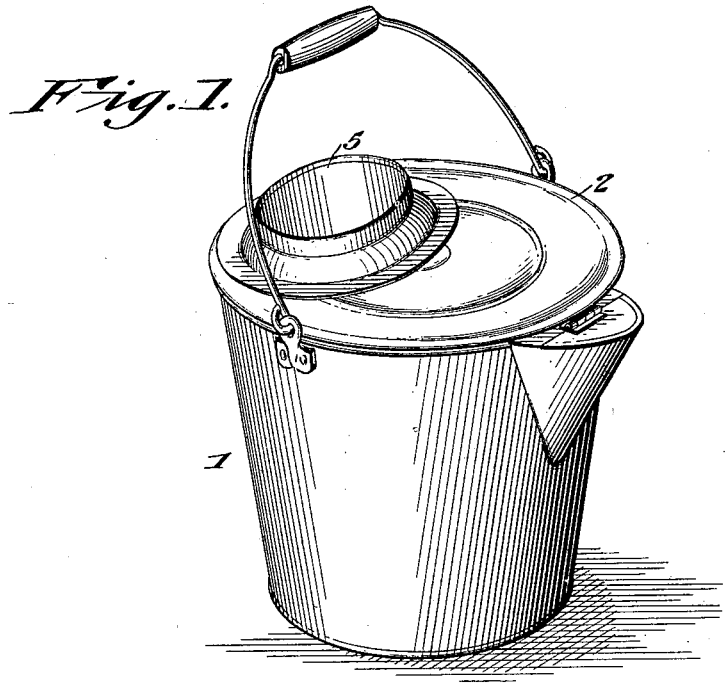
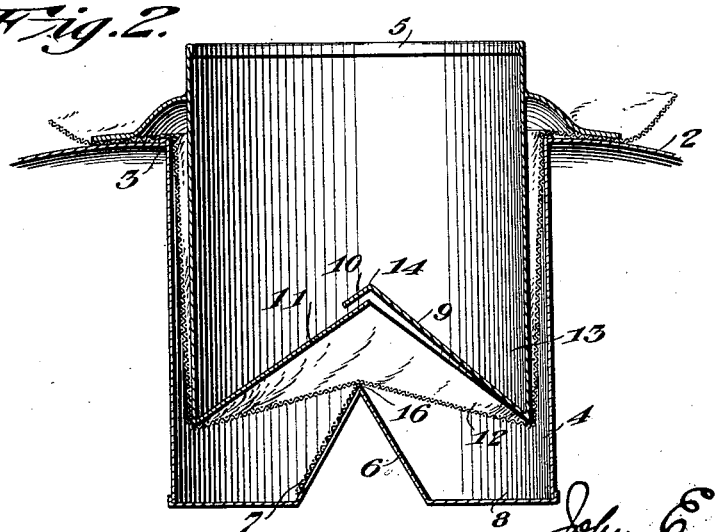
Witnesses
Lloyd W. Patch
Vernon E. Hodges
Inventor
John E. Brown
By C. A. Brandenburg
His Attorney

UNITED STATES PATENT OFFICE.

JOHN E. BROWN, OF PUTNAM, CONNECTICUT.

COVERED MILK-PAIL.

1,005,687.　　　　Specification of Letters Patent.　　Patented Oct. 10, 1911.

Application filed January 19, 1911. Serial No. 603,499.

*To all whom it may concern:*

Be it known that I, JOHN E. BROWN, a citizen of the United States, residing at Putnam, in the county of Windham and State of Connecticut, have invented certain new and useful Improvements in Covered Milk-Pails, of which the following is a specification.

My invention relates to an improvement in covered milk pails, and the object is to provide means for excluding dust and dirt by providing a top of such construction that a closure is formed against any substances dropping or settling thereon, while at the same time permitting the milk to enter and pass over two settling spaces while being strained on its passage into the pail.

A further object is to provide a covered milk pail having a strainer which may be easily cleaned after using.

With these objects in view, my invention consists in certain novel features of construction and combinations of parts which will be hereinafter described and pointed out in the claims.

In the accompanying drawings:—Figure 1 is a view in perspective, and Fig. 2 is a vertical section.

The pail 1 is provided with a cover 2. This cover has an opening 3 formed therethrough, preferably at one side of the center. There are two cisterns, namely 4 and 5, and cistern 4 is soldered or otherwise secured in this opening 3, whereas the other cistern 5 is removably held therein. Across the bottom of cistern 4, an A-shaped ridge 6 is formed, one side of which is imperforate, and the other is in the form of a strainer 7, thus forming a settling space 8 on the right.

The bottom of the removable cistern 5 conforms somewhat in general outline to that of cistern 4, except that the inclination of the bottom is less. One side 9 of the bottom of the removable cistern 5 terminates in an overlapping lip 10, whereas the other side of the bottom 11 terminates beneath the lip. Cheese-cloth or other straining fabric 12 is placed between the two cisterns, as illustrated.

In operation, the milker usually milks into the right-hand chamber or pocket 13, which forms a settling space to catch any extraneous material. As this fills, the milk overflows at the apex 14 to the other side, running down upon the portion 11 of the bottom where it accumulates until it rises to the level of the lip 10, whereupon it passes through the space between the lip and the upper edge of the part 11 and the bottom, after which it flows downwardly along the lower surface of the side 9 of the bottom, dropping off at the lower angle into the settling space 8, which space fills to overflowing, and when the apex 16 is reached, the milk descends over the strainer 7, thence out into the pail in which the cisterns are located. In this way, two settling spaces are provided, namely at 13 and 8, and nothing but milk can finally pass into the pail, the extraneous matter first settling into the space 13 and the milk then being strained through the cloth; and anything not caught in the settling space 13 is bound to be caught at one side or the other of the A-shaped portion of the bottom of the fixed cistern 4.

When it is desired to clean the removable cistern, it is done without any difficulty whatever by turning it upside-down in water, and raising and lowering it rapidly a few times, thus creating a suction which will remove all dirt and cleanse the parts thoroughly. The upper cistern protects the strainer of the lower cistern from being clogged, and it has been found after using for a long time that the strainer 7 is as clean as in the beginning.

More or less slight changes might be resorted to in the form and arrangement of the several parts described without departing from the spirit and scope of my invention, and hence I do not wish to be limited to the exact construction of the several parts described, but:—

Having fully described my invention, what I claim as new and desire to secure by Letters Patent, is:—

1. A covered milk-pail having in its cover one fixed and one removable cistern, both of which have A-shaped bottoms, and one having a strainer in the A-shaped portion, one cistern located within and discharging into the other.

2. A covered milk-pail having in its cover one fixed and one removable cistern, one of which is located within the other, both of which have A-shaped bottoms, and one having a strainer in the A-shaped portion, and the other having a vent extending the length thereof at the apex, whereby the milk after passing through the vent descends along the lower surface of one side of the bottom to a settling space below.

3. A covered milk pail having two cisterns in the cover, one fixed and the other removable, one cistern being located within the other, each of which cisterns has a settling space in the bottom, and one provided with a strainer and the other an opening through its bottom into the outer cistern.

4. A covered milk-pail having an opening in the cover, a cistern fixed in the opening and one cistern removable within the other cistern, each having an A-shaped bottom, the two cisterns in communication with each other through the apex of the bottom of one, and the other having a strainer on one side of the A-shaped portion of the bottom.

5. A covered milk pail, the cover of which has two cisterns, one fixed and the other removable, one cistern located within the other, one cistern having a strainer in its bottom and the other provided with an A-shaped bottom having an outlet at the apex formed by a lip overlapping the adjacent portion of the other side of the bottom, whereby the milk passing through the said orifices follows the lip, and the side of which the lip is a continuation, by capillary attraction.

In testimony whereof I affix my signature, in the presence of two witnesses.

JOHN E. BROWN.

Witnesses:
WILLIS B. CARROLL,
CHARLES L. TORREY.

---

Copies of this patent may be obtained for five cents each, by addressing the "Commissioner of Patents, Washington, D. C."